US010583883B2

(12) United States Patent
Visenzi (10) Patent No.: US 10,583,883 B2
(45) Date of Patent: Mar. 10, 2020

(54) AUTOMATIC SYSTEM FOR HOOKING MOTORCYCLE BAGS

(71) Applicant: GIVI S.r.l., Flero (IT)

(72) Inventor: Giuseppe Visenzi, Brescia (IT)

(73) Assignee: GIVI, S.R.L., Flero, Brescia (IT)

( * ) Notice: Subject to any disclaimer, the term of this patent is extended or adjusted under 35 U.S.C. 154(b) by 9 days.

(21) Appl. No.: 15/769,014

(22) PCT Filed: Oct. 28, 2016

(86) PCT No.: PCT/IB2016/056516
§ 371 (c)(1),
(2) Date: Apr. 17, 2018

(87) PCT Pub. No.: WO2017/072720
PCT Pub. Date: May 4, 2017

(65) Prior Publication Data
US 2018/0304950 A1    Oct. 25, 2018

(30) Foreign Application Priority Data

Oct. 29, 2015 (IT) .................. 102015000067048

(51) Int. Cl.
*B62J 9/00* (2006.01)
*B62H 5/00* (2006.01)
(Continued)

(52) U.S. Cl.
CPC .............. *B62J 9/00* (2013.01); *B62H 5/001* (2013.01); *B62J 7/08* (2013.01); *B62J 11/00* (2013.01)

(58) Field of Classification Search
CPC ..... B62J 9/00; B62J 7/08; B62J 11/00; B62H 5/001
(Continued)

(56) References Cited

U.S. PATENT DOCUMENTS 5,435,471 A * 7/1995 Chuang ............... B62J 9/00
224/419
5,579,971 A * 12/1996 Chuang ............... B62J 9/001
224/430
(Continued)

FOREIGN PATENT DOCUMENTS

CN     2346674 Y    11/1999
CN     102803057 A  11/2012
(Continued)

OTHER PUBLICATIONS

International Search Report and Written Opinion corresponding to PCT/IB2016/056516, dated Mar. 1, 2017.
(Continued)

*Primary Examiner* — Justin M Larson
*Assistant Examiner* — Lester L Vanterpool
(74) *Attorney, Agent, or Firm* — Pepper Hamilton LLP (57) ABSTRACT

The present document describes a system for hooking and unhooking a bag with respect to a fixed structure of a motorcycle that comprises a tubular fixing frame, configured to be constrained to the fixed structure, one or more fixing blocks, configured to be constrained on predefined portions of the bag and to engage with the tubular fixing frame, and a fixing group, configured to be constrained to the bag and provided with one or more hook-shaped movable hooking means. The movable hooking means are rotatably actuatable, by means of a lock mechanism, between a first operative configuration, in which the movable hooking means are engaged with the tubular fixing frame, and a second non-operative configuration, in which the movable hooking means are released with respect to the tubular fixing frame and it is possible to obtain the unhooking of the bag from the motorcycle. The system also comprises a lock element integrally mounted on the fixing group and configured to maintain the movable hooking means locked when (Continued)

the lock mechanism is not actuated. The fixing group comprises first elastic means, configured to move the movable hooking means between the first operative configuration and the second non-operative configuration, and second elastic means, configured to move the movable hooking means between the second non-operative configuration and the first operative configuration.

15 Claims, 8 Drawing Sheets

(51) Int. Cl.
*B62J 7/08* (2006.01)
*B62J 11/00* (2020.01)

(58) Field of Classification Search
USPC .......................................................... 224/413
See application file for complete search history.

(56) References Cited

U.S. PATENT DOCUMENTS

| | | | | |
|---|---|---|---|---|
| 5,810,230 A * | 9/1998 | Nutto | ............ | B62J 9/00 |
| | | | | 224/417 |
| 6,631,835 B2 * | 10/2003 | Fang | ............ | B62J 9/001 |
| | | | | 224/315 |
| 8,028,877 B2 * | 10/2011 | Lien | ............ | B62J 9/001 |
| | | | | 224/417 |
| 8,292,139 B2 * | 10/2012 | Golub | ............ | B62J 9/001 |
| | | | | 224/419 |
| 8,864,002 B2 * | 10/2014 | Iida | ............ | B62J 7/04 |
| | | | | 224/413 |
| 9,056,641 B2 * | 6/2015 | Visenzi | ............ | B62J 7/08 |
| 9,604,685 B2 * | 3/2017 | Schanz | ............ | B62J 9/00 |
| 2003/0066854 A1 * | 4/2003 | Heinrich | ............ | B62J 7/04 |
| | | | | 224/413 |
| 2006/0138185 A1 * | 6/2006 | Lien | ............ | B62J 7/00 |
| | | | | 224/427 |
| 2009/0308903 A1 * | 12/2009 | Vigeant | ............ | B62J 7/08 |
| | | | | 224/431 |
| 2010/0181356 A1 * | 7/2010 | Visenzi | ............ | B62J 9/00 |
| | | | | 224/413 |
| 2012/0272697 A1 | 11/2012 | Motherwell | | |

FOREIGN PATENT DOCUMENTS

| | | | | |
|---|---|---|---|---|
| DE | 19827973 A1 * | 3/2000 | ............ | B62J 7/04 |
| DE | 19827973 A1 | 3/2000 | | |
| DE | 19928304 A1 * | 1/2001 | ............ | B62J 7/08 |
| DE | 102006039465 A1 * | 3/2008 | ............ | B62J 9/00 |
| DE | 102013004614 A1 * | 9/2014 | ............ | B62J 7/08 |
| EP | 2597019 A1 | 5/2013 | | |
| WO | 2011/098897 A1 | 8/2011 | | |
| WO | WO-2014024141 A1 * | 2/2014 | | |

OTHER PUBLICATIONS

Chinese Office Action for U.S. Appl. No. 15/769,014, dated Jul. 1, 2019.

* cited by examiner

AUTOMATIC SYSTEM FOR HOOKING MOTORCYCLE BAGS

This application is a national stage application under 35 U.S.C. § 371 of PCT Application No. PCT/IB2016/056516, filed Oct. 28, 2016, which claims the priority benefit of Italy Application No. 102015000067048, filed Oct. 29, 2015.

The present invention refers to an automatic system for hooking motorcycle bags or cases.

The use on motorcycles in general of carriers, bags or cases adapted for housing luggage, helmets or other accessories is well known. Such bags are usually applied in the rear part of the motorcycle and usually comprise a suitable frame, which is fixed stably to the motorcycle itself, and systems for hooking to such a frame. Usually, the hooking systems are of the removable type and are provided in the bottom portion of the bag, which can be made both of fabric, and of plastic or metallic material.

Various types of hooking systems are known that propose to ensure a stable and secure fixing of the bag on the motorcycle, at the same time avoiding accidental unhooking or false hooking. Hooking systems for cycles and motorcycle bags or cases are illustrated, for example, in documents DE 198 27 973 A1, US 2006/138185 A1 and DE 92 15 430 U1. Some of these hooking systems, however, require the use of specific tools to obtain the hooking and unhooking of the bag with respect to the motorcycle, thus being complicated to use. Other hooking systems are provided with button or lever means to allow the application and removal of the bag. Such means are clearly very simple to actuate, but do not prevent accidental detachment of the bag from the motorcycle and are usually provided with complicated operating mechanisms.

For example, document WO 2011/098897 A1 describes a hooking system for motorcycle bags configured to be simple to use, both during hooking and during unhooking of the bag. However, such a hooking system does not allow the automatic hooking of the bag. In addition, such a hooking system does not allow the adjustment of the hooking points of the bag with respect to its frame fixed to the motorcycle.

The purpose of the present invention is therefore that of making an automatic hooking system for motorcycle bags or cases that is capable of solving the aforementioned drawbacks of the prior art in an extremely simple, cost-effective and particularly functional manner.

In detail, a purpose of the present invention is to make an automatic hooking system for motorcycle bags or cases that allows the automatic hooking of the bag to its frame fixed to the motorcycle.

Another purpose of the present invention is to make an automatic hooking system for motorcycle bags or cases that is provided with bag hooking points that are separate from one another, thus positionable at different points of the bag itself and, consequently, of the respective frame according to requirements.

A further purpose of the present invention is to make an automatic hooking system for motorcycle bags or cases that has a simple and strong structure.

These purposes according to the present invention are accomplished by making an automatic hooking system for motorcycle bags or cases as outlined in claim 1.

Further characteristics of the invention are highlighted by the dependent claims, which are an integral part of the present description.

The characteristics and advantages of an automatic hooking system for motorcycle bags or cases according to the present invention will become clearer from the following description, given as an example and not for limiting purposes, referring to the attached schematic drawings, in which.

With reference to the figures, an automatic system for hooking and unhooking a motorcycle bag 10 according to the present invention is shown. The bag 10 can be of the type applicable to a fixed structure (not shown) of a motorcycle, both in lateral position (as a "side bag"), and above the rear mudguard of the motorcycle itself (as a "top case"), although this does not rule out other applications in different positions on the motorcycle without for this reason departing from the scope of protection of the present invention.

The bag 10 is provided with a base portion 12, which can be advantageously preformed in the production step of the bag 10 itself, on which a fixing group 14 belonging to the system can be constrained. The fixing group 14 is configured to be connected to a fixing frame 16, of the tubular type, in turn configured to be constrained to a fixed structure of the motorcycle, like for example the rear mudguard or the bearing frame of the motorcycle itself. In the case of a side bag, the fixing group 14 is configured to be arranged on top of the tubular fixing frame 16, with reference to the position of the bag 10 with respect to the motorcycle.

The system also comprises one or more fixing blocks 18 configured to be constrained on predefined portions of the bag 10 and to engage with a first portion 20 of the tubular fixing frame 16. In the embodiment shown in the figures, relative to a hooking system for side bags, there are two fixing blocks 18 and they are configured to be arranged at the lower portion of the tubular fixing frame 16, with reference to the position of the bag 10 with respect to the motorcycle.

Figure 1:
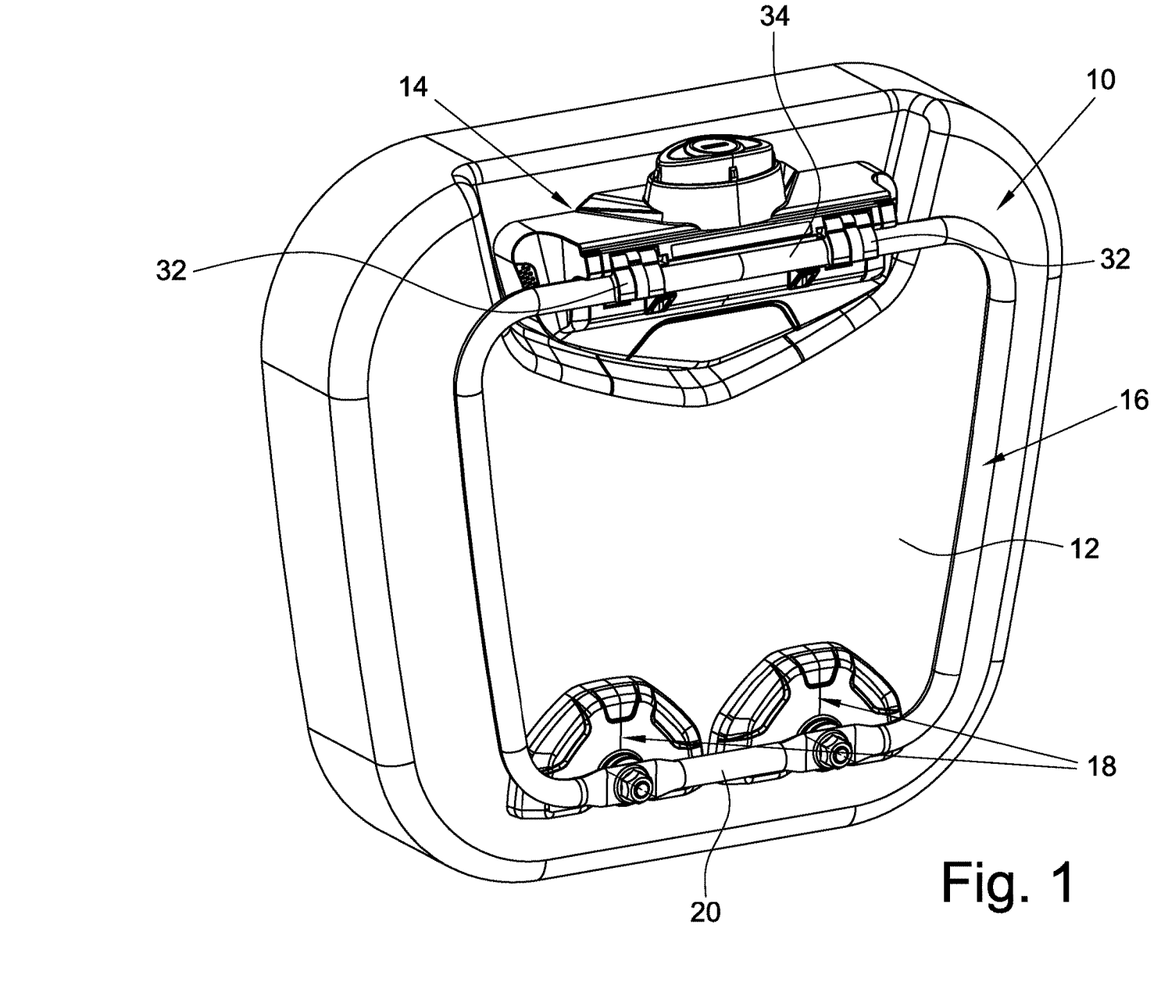
FIG. 1 is a perspective view of the automatic hooking system for motorcycle bags or cases according to the present invention, shown in mounted configuration and hooked to a generic motorcycle bag.
Figure 2:
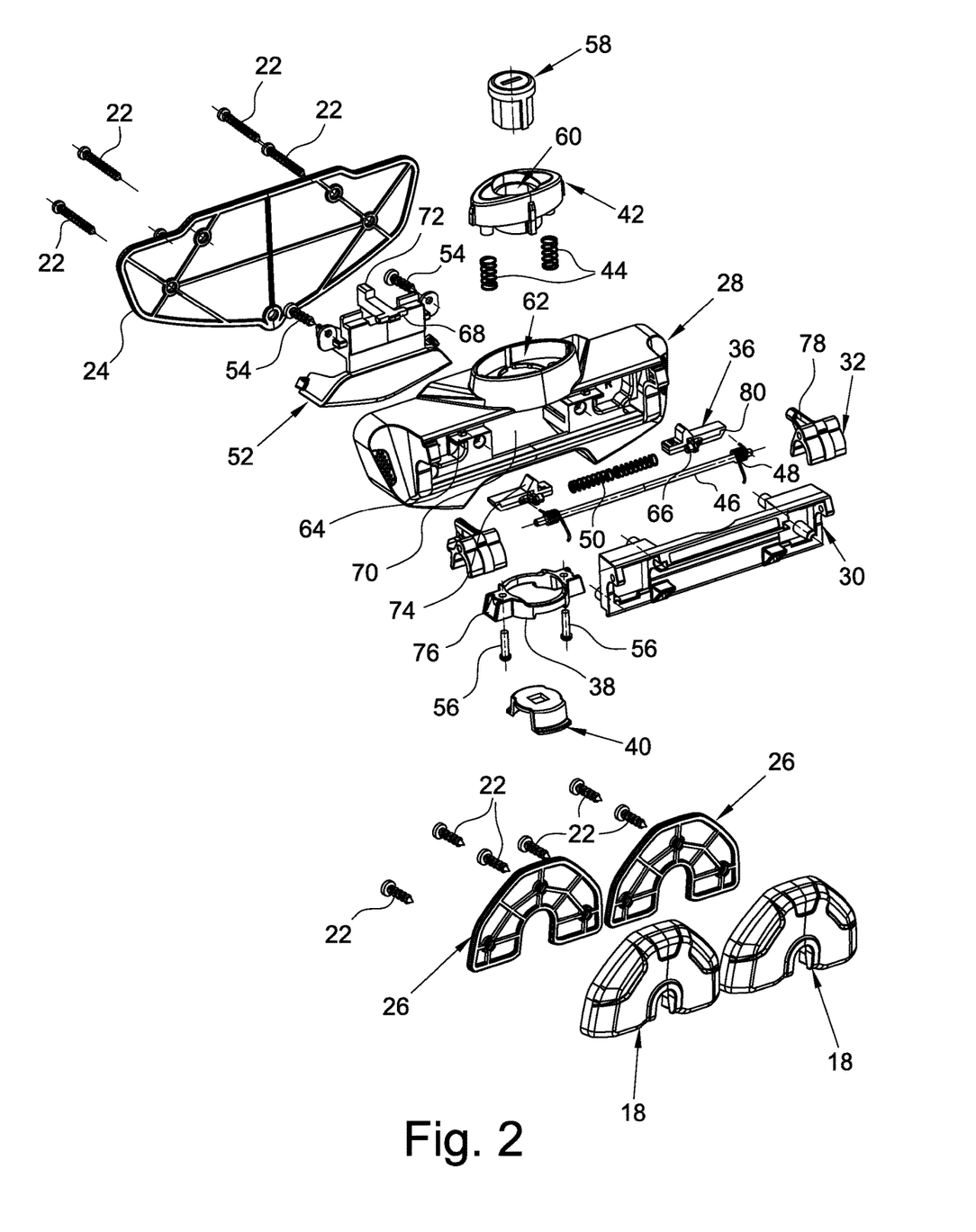
FIG. 2 is an exploded view of the components forming part of the system of FIG. 1.

Both the upper fixing group 14, and the lower fixing blocks 18 can be fixed to the base portion 12 of the bag 10 by means of screws 22 (FIG. 2). For safety reasons, both the upper fixing group 14, and the lower fixing blocks 18 are fixed to the base portion 12 of the bag 10 by means of respective contrast plates 24 and 26 (FIG. 2). Both the contrast plate 24 of the fixing group 14, and the contrast plates 26 of the fixing blocks 18 are arranged on the internal surface of the base portion 12, in other words inside the bag 10, so that the base portion 12 is "sandwiched" between the contrast plates 24 and 26 and the respective upper fixing group 14 and lower fixing blocks 18.

With reference to FIG. 2, the fixing group 14 consists of a main fixing body 28 in which a secondary fixing body 30 is inserted that contains the movable hooking means 32 of the fixing group 14 itself. Indeed, two distinct movable hooking means 32 are provided that are configured to engage with a second portion 34 of the tubular fixing frame 16 opposite to the aforementioned first portion 20. Each movable hooking means 32 is provided with a respective latch 36. Both of the latches 36 are operatively connected to a guiding element 38, in turn operatively connected to a sub-lock plate 40.

An opening button 42 is applied on the main fixing body 28. The opening button 42 is provided with one or more respective springs 44. The two distinct movable hooking means 32 are mounted on a single pin 46 that allows the simultaneous movement thereof. Between each movable hooking means 32 and the respective pin 46 a first elastic means 48 is arranged, made in the form of a torsion spring 48. The latches 36 are also operatively associated with respective second elastic means 50, made in the form of springs operating by compression arranged between the latches 36 themselves.

The latches 36 are operatively connected to the guiding element 38 by means of respective conical portions 74, the operation of which will be described in greater detail hereinafter. One or more guiding screws 56 connect the guiding element 38 to the opening button 42. A key lock 58 that controls the sub-lock plate 40 is then applied on the opening button 42.

Finally, a lock element 52 configured to maintain the movable hooking means 32 locked when the assembly of the lock mechanism consisting of opening button 42, key lock 58, guiding element 38 and sub-lock plate 40 is not actuated is integrally mounted on the fixing group 14. The lock element 52 is integral with the main fixing body 28 by means of respective screws 54.

The automatic hooking system according to the invention is mounted by inserting the key lock 58 in a respective first seat 60 formed on the opening button 42. The opening button 42, complete with key lock 58, thus inserts in a respective second seat 62 formed on the main fixing body 28. The opening button 42 is finally made integral with the guiding element 38 of the latches 36 by means of the guiding screws 56. The sub-lock plate 40 can be fixed to the key lock 58 by means of known fixing means, like for example a stop ring of the Seeger type or a nut.

The lock element 52 can be mounted on the main fixing body 28 using corresponding interlocking means. The main fixing body 28 is thus provided with suitable guiding seats 64 configured for the sliding insertion of the latches 36.

The compression springs 50 of the latches 36 insert between suitable first projection elements 66 integrally obtained on the latches 36 themselves and corresponding second projection elements 68 integrally obtained on the lock element 52. In this way, the translatory movement of the latches 36 with respect to the lock element 52 and, consequently, with respect to the fixing group 14, is allowed.

Figure 6:
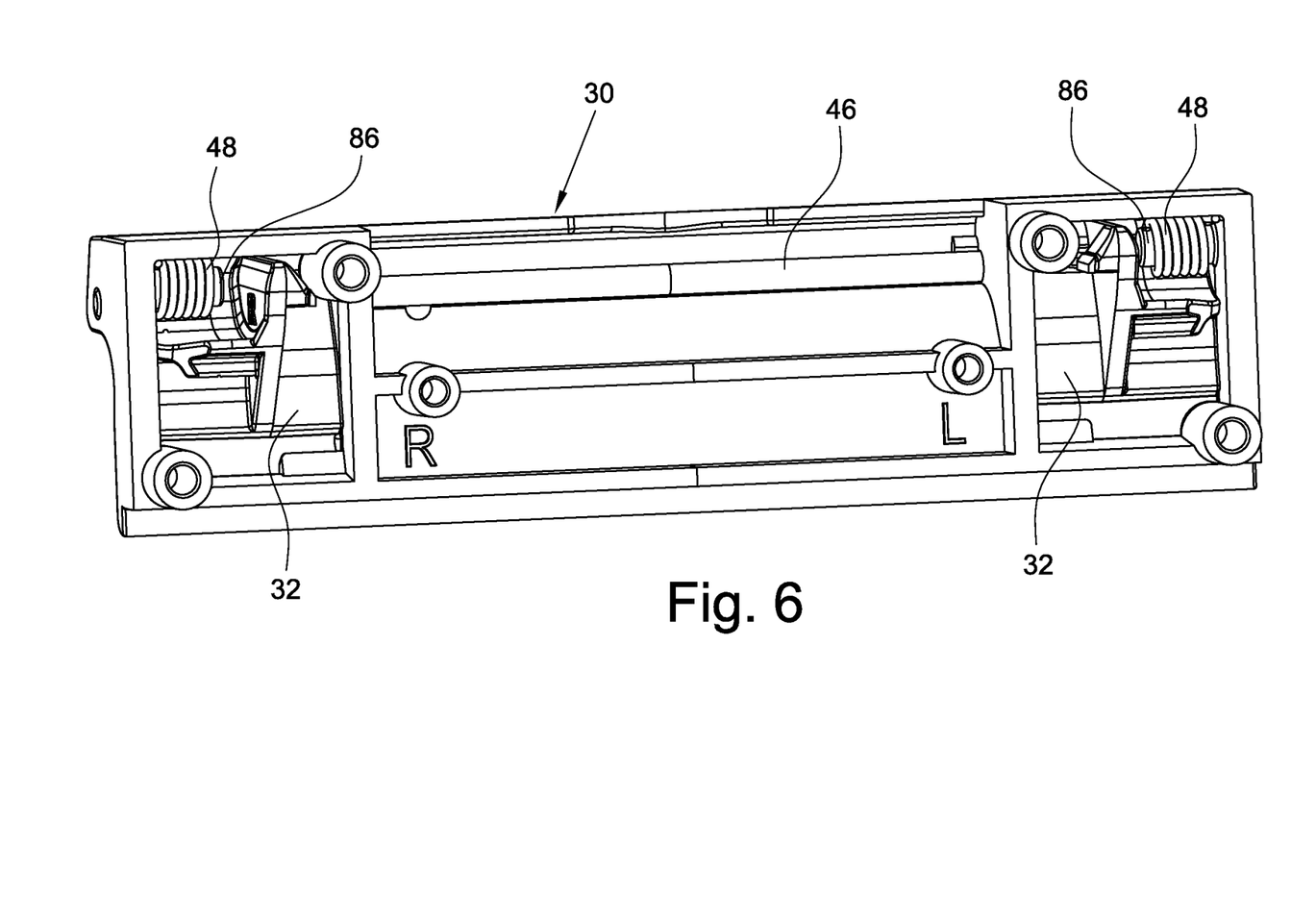
FIG. 6 is a detailed view of a component of the fixing group of the system of FIG. 1.

The torsion springs 48 are mounted on respective contrast pins 86 (FIG. 6) integrally obtained on the secondary fixing body 30. The movable hooking means 32 are also mounted on the secondary fixing body 30 using the pin 46. The secondary fixing body 30, thus pre-assembled, inserts in a corresponding cavity 70 of the main fixing body 28. The main fixing body 28, the secondary fixing body 30 and the lock element 52 are thus made definitively integral with each other by means of the screws 54.

Figure 3:
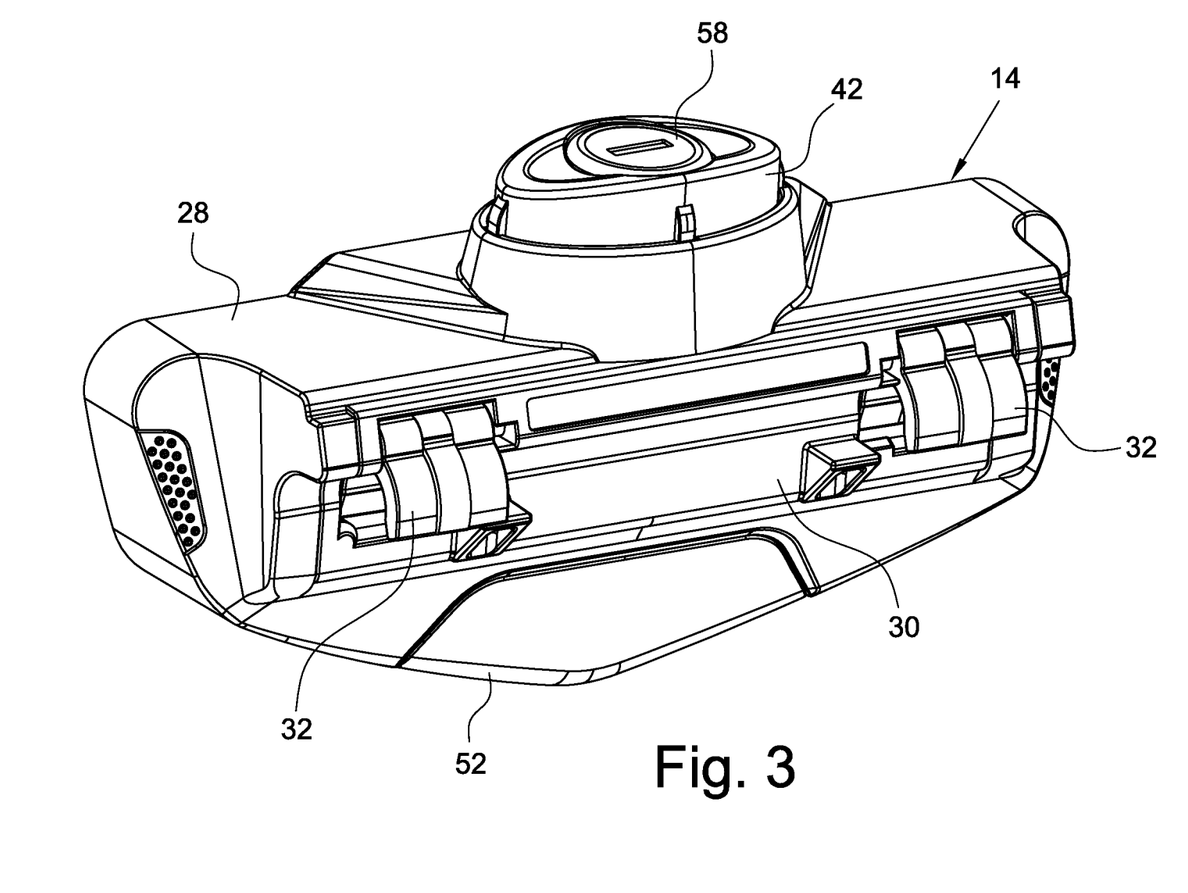
FIG. 3 is a perspective view of the fixing group of the system of FIG. 1, shown in closed position.
Figure 4A:
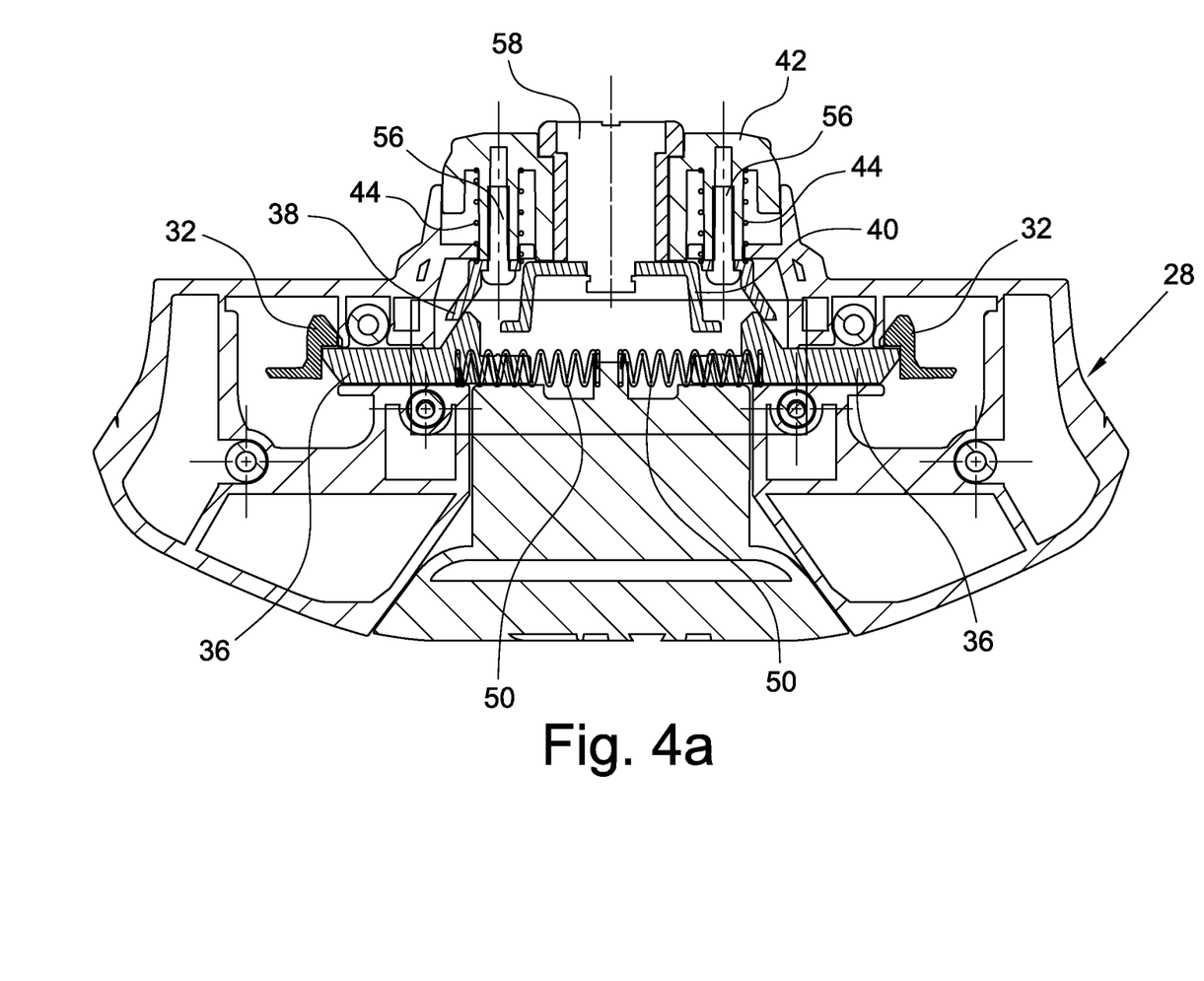
FIGS. 4A and 4B are two section views that respectively show two operative configurations of the fixing group of FIG. 3.
Figure 4B:
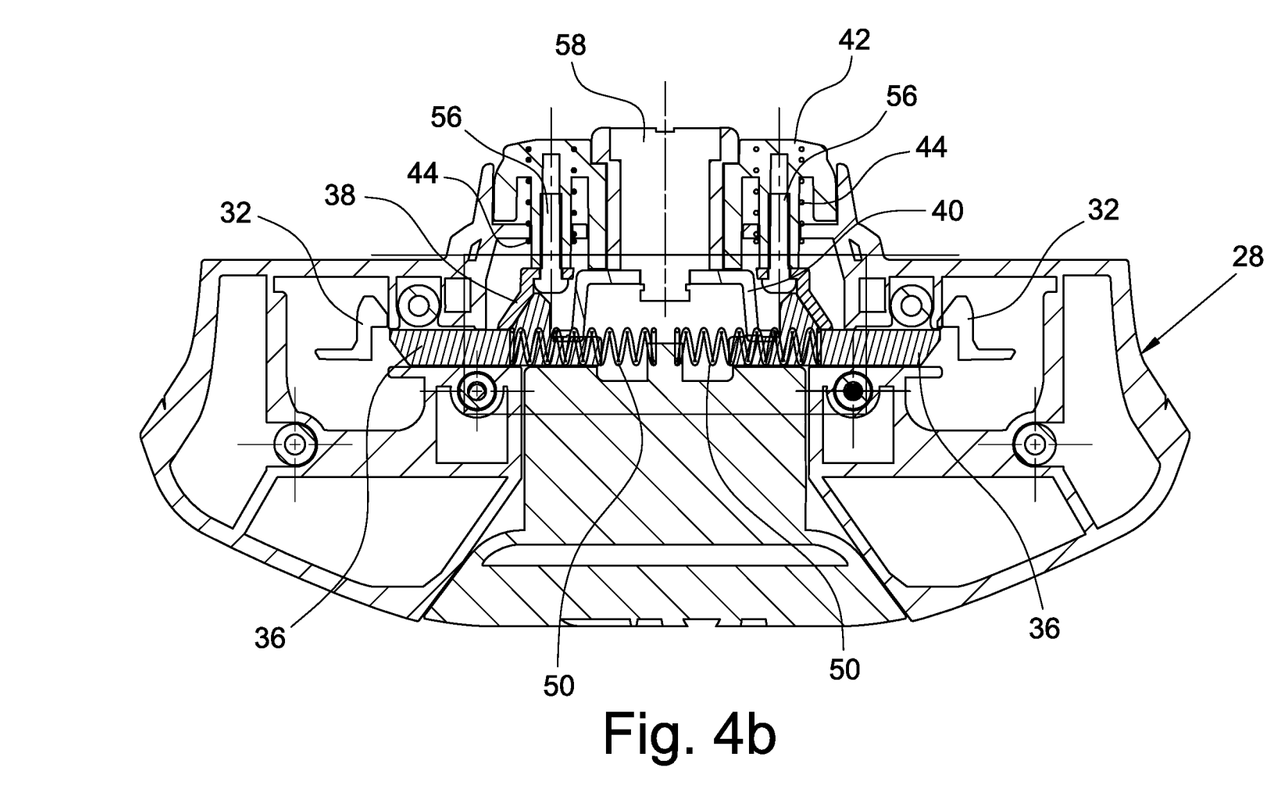

The operation of the fixing group 14 of the automatic hooking system according to the invention is very simple and takes place as follows, with reference to FIGS. 3, 4A and 4B. In the first operative configuration, with the key (not shown) in closed position, the sub-lock plate 40 interferes with a rib 72 of the lock element 52 and does not allow the opening button 42 to move. The fixing group 14 is thus locked. FIG. 3 illustrates the fixing group 14 in a first operative configuration, or closed position, i.e. with the movable hooking means 32 engaged with the respective second portion 34 of the tubular fixing frame 16.

By rotating the key and, therefore, the key lock 58 into open position a rotary movement of 90° of the sub-lock plate 40 is obtained. This rotary movement allows the sub-lock plate 40 to be freed from interferences with other elements of the fixing group 14, allowing the opening button 42 to be squashed downwards, with reference to the position of the bag 10 with respect to the motorcycle.

The downward movement of the opening button 42 also generates a corresponding downward movement of the guiding element 38 of the latches 36. Each latch 36 is provided with a respective conical portion 74 configured to engage with a corresponding inclined plane 76 formed on the guiding element 38. The sliding of the conical portions 74 of the latches 36 on the corresponding inclined planes 76 of the guiding element causes a respective sliding movement, or mutual approach, of the latches 36 themselves. The mutual translatory approach movement of the latches 36, obtained by counteracting the action of the compression springs 50, causes the release of the movable hooking means 32 that, through the effect of the respective torsion springs 48, rotate automatically going into a second non-operative configuration, or open position.

By releasing the opening button 42 the respective springs 44 take it back into the closed position. The latches 36 are also automatically taken back into the closed position, thanks to the action of the compression springs 50. The movable hooking means 32 go back into closed position by rotating inwards, i.e. towards the fixing group 14.

In this way a specific inclined portion 78 of each movable hooking means 32 engages with a corresponding tooth 80 of the respective latch 36, making the latches slide towards one another counteracting the action of the compression springs 50. Once the stroke of the tooth 80 on the respective inclined portion 78 has ended, each latch 36 again moves away from the other latch 36 through the effect of the compression springs 50, locking the respective movable hooking means 32. This procedure is shown in FIGS. 4A and 4B.

Figure 5A:
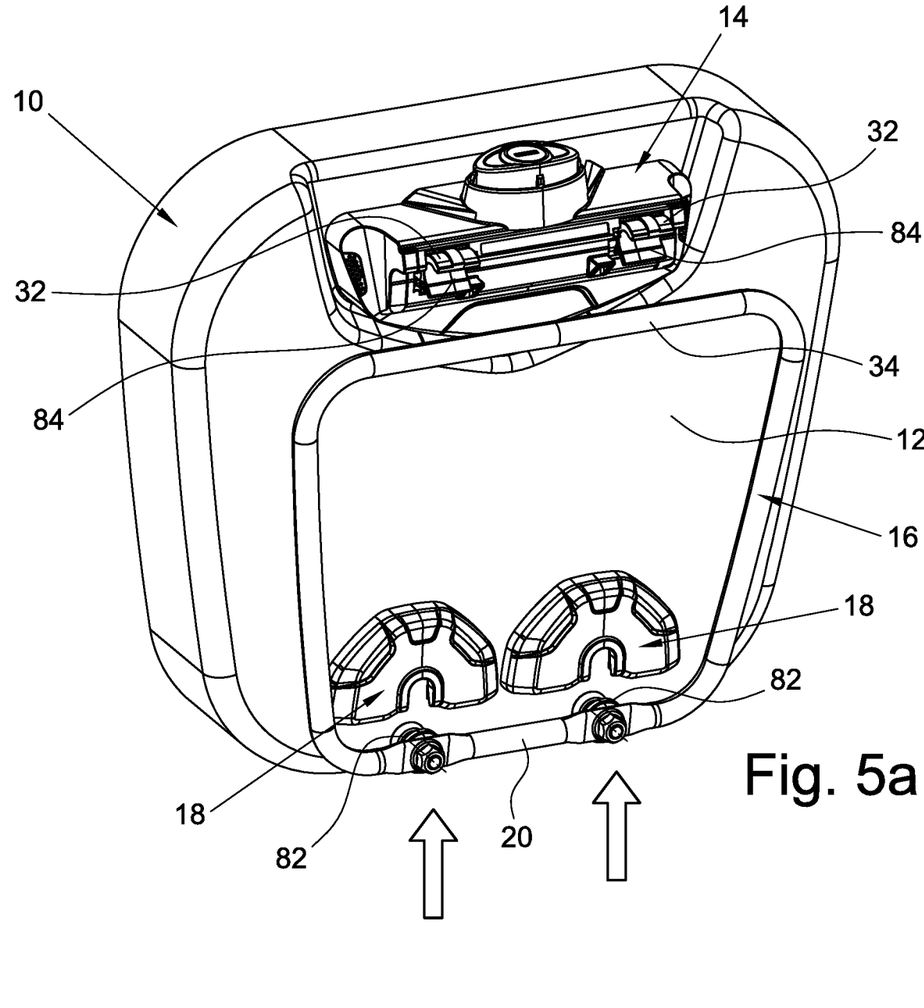
FIGS. 5A and 5B are two perspective views respectively showing two operative configurations of the system of FIG. 1.
Figure 5B:
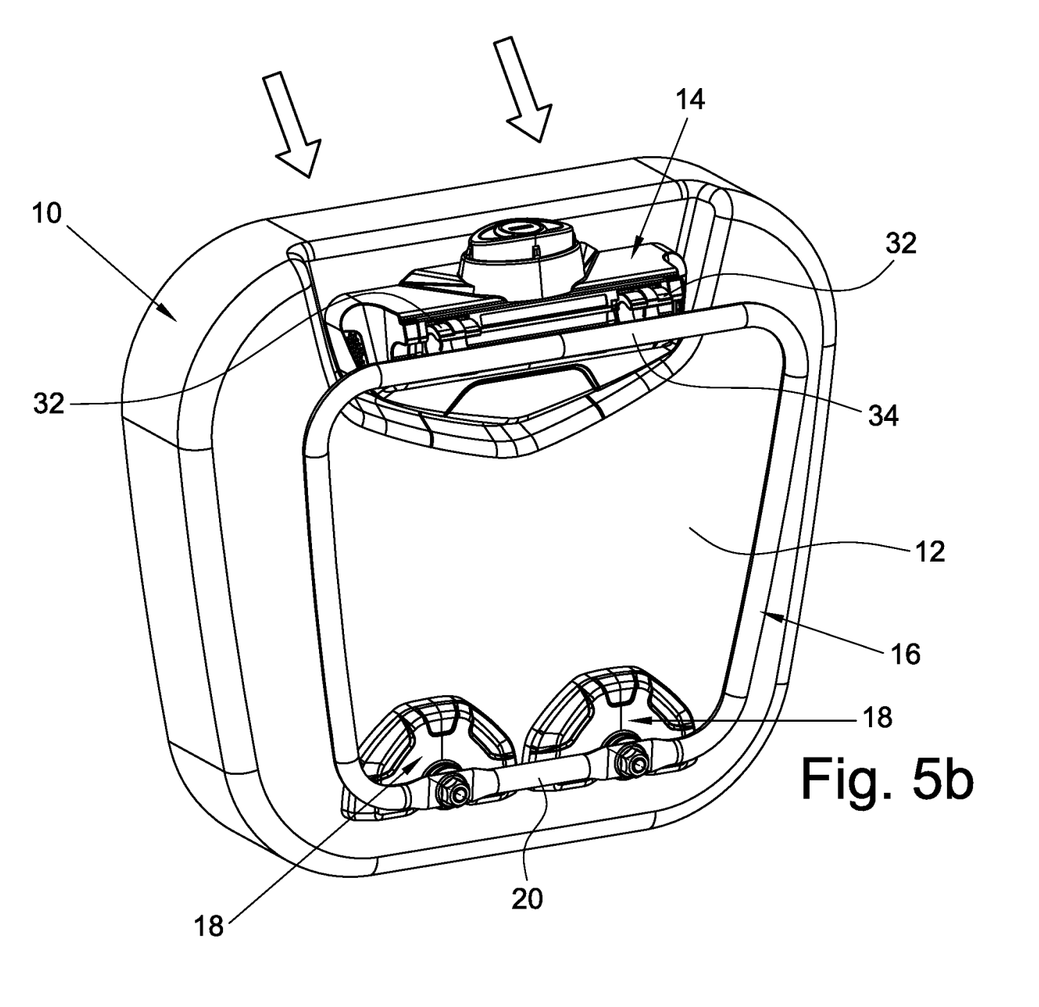

In order to hook the bag 10 to the tubular fixing frame 16 it is necessary to place the movable hooking means 32 in open position and then proceed in the following way (with reference to FIGS. 5A and 5B):

coupling the lower fixing blocks 18 with respective mushroom pins 82 formed on the first portion 20 of the tubular fixing frame 16;

rotating the bag 10 until the second portion 34 of the tubular fixing frame 16 enters into the concave seat 84 (FIG. 5A) of each movable hooking means 32;

with only the pressure of the rotation movement of the bag 10 the corresponding rotation of the movable hooking means 32 is generated that, going automatically into closed position, embrace the second portion 34 of the tubular fixing frame 16 and fix the bag 10 to the tubular fixing frame 16 itself.

The hooking procedure of the bag 10 to the tubular fixing frame 16 can occur both with the key and the key lock 58 in open position, and with the key and the key lock 58 in closed position, with the sole constraint that the latches 36 are initially in open position.

In order to unhook the bag 10 from the tubular fixing frame 16 it is sufficient to carry out the following operations:

rotating the key lock 58 into open position;

pressing the opening button 42 until the movable hooking means 32 open;

removing the bag 10 from the tubular fixing frame 16.

The automatic hooking system described up to now, of the type applicable to side bags of a motorcycle, can also be used for so-called topcases by simply changing the shape of the tubular fixing frame 16. Such a tubular fixing frame 16 can indeed be provided with one or more reinforcing walls capable of supporting the weight of the topcase and of preventing it from bearing down on the fixing group 14 beneath and on the relative mechanisms.

It has thus been seen that the automatic hooking system for motorcycle bags or cases according to the present invention achieves the purposes outlined earlier.

The automatic hooking system for motorcycle bags or cases of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. A device for hooking and unhooking a bag with respect to a fixed structure of a motorcycle, the system comprising:
    a tubular fixing frame configured to be constrained to the fixed structure and provided with a first portion and with a second portion that is opposite to said first portion;
    one or more fixing blocks configured to be constrained on predefined portions of the bag and to engage with the first portion of the tubular fixing frame;
    a fixing group configured to be constrained to the bag and provided with one or more hook-shaped movable hooking devices rotatably actuatable by a lock mechanism between a first operative configuration, in which the movable hooking devices are engaged with the second portion of the tubular fixing frame, and a second non-operative configuration, in which the movable hooking devices are released with respect to the second portion of the tubular fixing frame the bag can be unhooked from the motorcycle; and
    a lock element integrally mounted on the fixing group and configured to maintain the movable hooking devices locked when the lock mechanism is not actuated, wherein the fixing group comprises a first elastic element, configured to move the movable hooking devices between the first operative configuration and the second non-operative configuration, and wherein the fixing group comprises a second elastic element, configured to move the movable hooking devices between the second non-operative configuration and the first operative configuration.

2. The device according to claim 1, wherein each of the movable hooking devices is provided with a respective latch that is operatively associated with the second elastic element, each of the latches being movable by translatory movement so as to cause the rotary movement of the respective movable hooking devices.

3. The device according to claim 2, wherein the movable hooking devices are mounted on a single pin that allows the movable hooking devices to be simultaneously moved, the first elastic element being interposed between each of the movable hooking devices and the pin.

4. The device according to claim 3, wherein each of the latches is operatively connected to a guiding element for guiding the lock mechanism, the guiding element being in turn operatively connected to a sub-lock plate of the lock mechanism.

5. The device according to claim 4, wherein the lock mechanism comprises an opening button provided with one or more respective springs whereon a key lock is applied that controls the sub-lock plate, wherein the sub-lock plate, when in the first operative configuration, interferes with a rib of the lock element and prevents movement of the opening button in order to maintain the fixing group locked, the sub-lock plate being rotatable in order to disengage from the interference and to allow movement of the opening button generating a corresponding movement of the guiding element.

6. The device according to claim 5, wherein each of the latches is provided with a respective conical portion configured to engage with a corresponding inclined plane on the guiding element, wherein the sliding of the conical portions of each of the latches on the corresponding inclined plane of the guiding element causes both a respective sliding movement of the corresponding latch and the release of the corresponding movable hooking device that, due to the effect of the respective first elastic element, automatically rotates, thus moving to the second non-operative configuration.

7. The device according to claim 6, wherein each of the movable hooking devices has an inclined portion configured to engage with a corresponding tooth of the respective latch and to move the latch, thus counteracting the action of the second elastic element.

8. The device according to claim 5, wherein the guiding element is operatively connected to the opening button by respective guiding screws.

9. The device according to claim 2, wherein the first elastic means comprises torsion springs and the second elastic element comprises compression springs.

10. The device according to claim 9, each of the compression springs is located between a first projection element integrally located on one of the latches and a corresponding second projection element integrally located on the lock element, so as to allow the translatory movement of the latches with respect to the lock element and the fixing group.

11. The device according to claim 1, where both the fixing group and the fixing blocks are fixed to a base portion of the bag by screws and respective contrast plates.

12. The device according to claim 11, wherein both the contrast plate of the fixing group (14) and each contrast plate of a respective fixing block (18) are located on the internal surface of the base portion so that the base portion (12) is positioned between the contrast plates and the respective fixing group and fixing blocks.

13. The device according to claim 1, wherein the fixing group comprises a main fixing body into which a secondary fixing body containing the movable hooking devices of the fixing group inserts, the lock element integrally coupled with the main fixing body by respective screws.

14. The device according to claim 13, wherein the first elastic element is mounted on respective contrast pins integrally located on the secondary fixing body.

15. The device according to claim 1, wherein one or more mushroom pins are disposed on the first portion of the tubular fixing frame, whereon the one or more fixing blocks respectively couple.

* * * * *